United States Patent [19]

Radinsky

[11] Patent Number: 5,668,996

[45] Date of Patent: Sep. 16, 1997

[54] RENDERING CD REDBOOK AUDIO USING ALTERNATIVE STORAGE LOCATIONS AND FORMATS

[75] Inventor: Wayne L. Radinsky, Redmond, Wash.

[73] Assignee: Microsoft Corporation, Redmond, Wash.

[21] Appl. No.: 641,053

[22] Filed: Apr. 29, 1996

[51] Int. Cl.$^6$ .................................................. G06F 9/44
[52] U.S. Cl. ............................................................ 395/681
[58] Field of Search ...................................... 395/680, 681

[56] References Cited

U.S. PATENT DOCUMENTS

| | | | |
|---|---|---|---|
| 5,307,491 | 4/1994 | Feriozi et al. | 395/681 |
| 5,319,751 | 6/1994 | Garney | 395/681 |
| 5,359,713 | 10/1994 | Moran et al. | 395/872 |
| 5,363,487 | 11/1994 | Willman et al. | 395/712 |
| 5,414,850 | 5/1995 | Whiting | 395/681 |
| 5,515,474 | 5/1996 | Deacon et al. | 395/2.1 |
| 5,519,853 | 5/1996 | Moran et al. | 395/551 |
| 5,586,324 | 12/1996 | Sato et al. | 395/681 |
| 5,598,563 | 1/1997 | Spies | 395/652 |

*Primary Examiner*—Kevin A. Kriess
*Attorney, Agent, or Firm*—Lee & Hayes, PLLC

[57] ABSTRACT

A CD-based application program must often be run in conjunction with its associated CD. Described herein, however, is a method that allows such an application program, without any modifications, to render its CD "Redbook" audio content from a storage device other than the associated CD. The method includes converting the Redbook audio content of the CD to an alternative single-file format such as a "WAVE" file format that is suitable for rendering on a local sound board. The file is stored on a local or network logical drive. In place of the simple device driver that is normally used by the application program to render CD audio from a local CD drive, a proxy device driver is installed. In response to instructions from the application program to render audio using the local CD drive, the proxy device driver instead reads the file from the local or network drive, and renders the file on a local sound card.

41 Claims, 4 Drawing Sheets

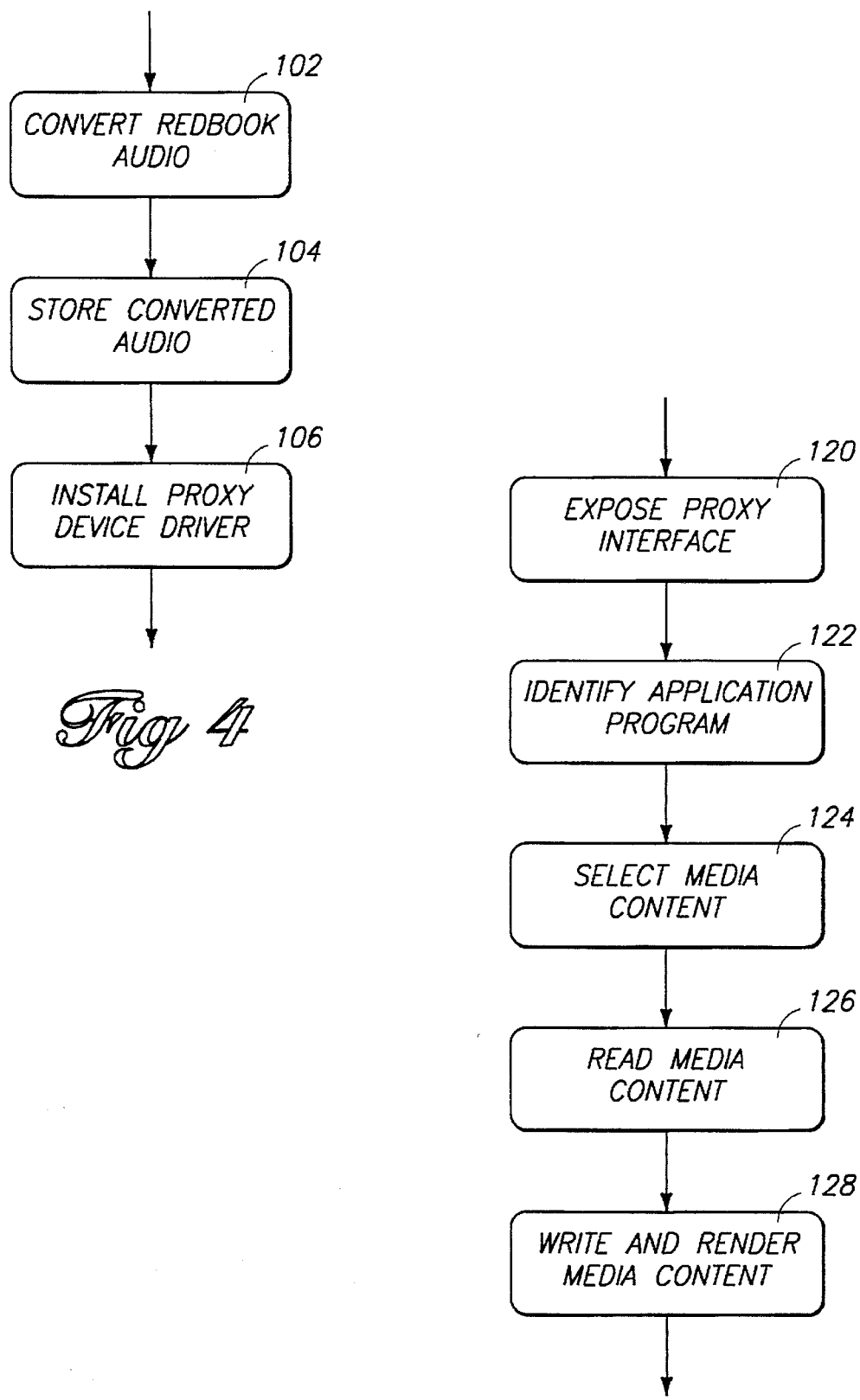

RENDERING CD REDBOOK AUDIO USING ALTERNATIVE STORAGE LOCATIONS AND FORMATS

TECHNICAL FIELD

This invention relates to methods and systems for rendering CD-ROM audio data from storage sources other than a CD.

BACKGROUND OF THE INVENTION

FIG. 1 shows elements of a typical computer or computer system 10 that are pertinent to the invention disclosed herein. Computer 10 comprises a data processor 12 and some form of mass storage 16 such as a readable and writable magnetic hard disk drive. An operating system executes on data processor 12. The invention will be described in the context of a computer running a Windows® operating system such as available from Microsoft® Corporation of Redmond, Wash. The operating system has components, referred to as drivers, for interacting with various computer hardware elements.

Computer 12 includes multimedia components for playing or rendering continuous media content. Audio and video are two examples of continuous media content. In the computer environment described herein, the continuous media content comprises digitized audio stored on a compact optical disk 20, also referred to as a CD or CD-ROM. A CD is a nonmagnetic, polished metal disk with a protective plastic coating, used to store digital information. The disk is read by an optical scanning mechanism that uses a high-intensity light source, such as a laser, and mirrors.

CDs were originally developed and used to store audio performances or other consumer-oriented audio content. This is still one of their primary uses. In this context, a CD is not necessarily thought of as a computer storage device, but rather as a convenient way to distribute and collect audio entertainment content. CD audio players exist, for use in conjunction with home audio systems, to play the audio content of CDs.

Audio content is conventionally organized on a CD as a number of performance tracks. Each performance track typically corresponds to a single song or some other identifiable segment of a performance. With most CD audio players, a listener can select any one of the tracks for playback, and can even move to a specific point or offset within a track.

The audio content of a CD is stored in a digital format. Each track consists of a continuous series or stream of digitized audio samples. A CD player reads these samples and converts them to an audio signal using digital-to-analog conversion techniques.

CDs can also be used for storing arbitrary, non-audio data for used by a computer. When such data is included on a CD, it conventionally occupies the first track of the CD—the audio information of this track is replaced with the non-audio data. Such a CD can also have other tracks containing conventional audio data.

The standard format of track-oriented, digitized data on a conventional CD is referred to as the "Redbook" format. The computer of FIG. 1 has hardware and software components for playing conventional CD audio that is in the Redbook format, referred to herein as "Redbook audio."

Computer 10 includes a CD player or drive 22 which accepts CD 20. CD drive 22 is capable of functioning similarly to a conventional audio CD player (such as one that might be used in conjunction with a home audio system) except that it functions in response to electronic controls issued by a computer rather than to front-panel controls operated by a listener. CD drive 22 includes optical elements for reading the Redbook audio data recorded on CD 20, and also includes digital-to-analog components for converting such data to an analog signal. This analog signal is connected to an amplifier 24 within computer 10 and from there to a speaker 26.

Computer 10 also includes components for rendering digitized audio from sources other than a CD, such as from magnetic mass storage 16. Specifically, computer 10 has a sound board 30 which performs digital-to-analog conversion. Digitized data can be read from storage device 16 and written to sound board 30 for rendering. Sound board 30 supplies an analog signal to amplifier 24, which is in turn connected to speaker 26 as already described. In practice, amplifier 24 is typically integrated on sound board 30.

The Windows® operating system has drivers for allowing an application program, such as application program 28, to render or play different types of audio. These drivers, which utilize other, low-level functions provided by the Windows® operating system, are part of the Windows® Media Control Interface (MCI). MCI provides applications written for Microsoft Windows® with device-independent capabilities for controlling media devices such as audio hardware, videodisc players, and animation players. More specifically, MCI provides device-independent, extensible interfaces for controlling virtually any type of media device.

The MCI interfaces provide a generic core set of commands to control different types of media devices. For example, MCI uses the same command to begin playback of an audio file, a videodisc track, and an animation sequence.

MCI devices and their drivers are classified as either simple devices and device drivers or compound devices and device drivers. Simple devices do not require a data file to be specified for playback. A CD audio player used for playback of Redbook audio is an example of a simple device. When instructed to begin playback of Redbook audio, a CD audio player simply plays whatever CD is currently inserted.

A driver associated with a simple device is not generally required to deal with actual digitized data—the data is both read and rendered by the rendering device itself. A CD audio player, for example, has integrated components for both reading data directly from a CD, and converting the data to an analog signal. A simple device driver associated with a CD player does not need to actually access the data to render it. The MCI interface has commands for playing Redbook data from CDs in this manner.

Compound devices require a data file specification for playback. The data file associated with a compound device is know as a device element. A driver associated with a compound device is often required to process digitized data. Such a driver is generally responsible for reading the data from a storage device and passing the data to a rendering device.

A WAVE file is an example of an audio file formatted for used with a compound device. A WAVE file typically has a filename extension consisting of the letters "WAV". For example, "JINGLE.WAV" would be a WAVE file in the Windows® environment. The MCI interface has commands for playing WAVE files.

FIG. 1 shows a simple MCI device driver 32 that is associated with CD drive 22 for playing or rendering CD 20.

To play CD 22, application program 28 issues appropriate MCI commands. To open a simple device such as CD drive 22, the application specifies the name of the device. To play a portion of the CD, application program 28 specifies timing information relative to whatever CD is in drive 22. For CDs, the MCI drivers expect such timing information in terms of track, minute, second, and frame parameters.

FIG. 1 also shows a compound device driver 34 for playing WAVE files. Such WAVE files are stored on magnetic mass storage medium 16 or on some other logically-addressed drive such as a network drive. To play a WAVE file, application program 28 identifies both a rendering device and a file specification. The compound MCI driver uses this information to stream the file content from the designated file to the rendering device and to thus render the data.

Popular multimedia application programs frequently make use of CDs for digitized audio and video content. In many cases, an application is associated with a particular CD, and that CD must be present in the user's CD drive for the application to operate correctly. The application makes use of different types of information on the CD, such as WAVE files and Redbook audio.

For rendering Redbook audio, the application program is configured to utilize a default device driver. This driver is specified by the name cdaudio in the Windows® MCI environment. To play Redbook audio from a CD, the application program issues an MCI command to open the cdaudio device. To play certain segments of the CD, the application issues further MCI commands that specify starting points and ending points in terms of performance track information.

Most application programs such as this are permanently configured to use the default cdaudio simple device driver. This is fine in many situations, but is somewhat restricting in other environments. In some cases, for instance, a user might want the application program to use audio data from a hard disk rather than from a CD. With the increasing use of networks, including the Internet and similar distribution systems, it is expected that many users will not even have CD drives on their computers. In such systems, and even in systems having CD drives, it might be desirable to distribute existing application programs from a network and to allow users to execute the application programs without a CD drive. This is not possible with existing application programs that are hard-coded to use a local CD drive.

SUMMARY OF THE INVENTION

The invention is a system in which the default MCI CD audio driver is replaced by a proxy device driver. The proxy device driver exposes an interface which is identical to that of the original CD audio driver, and the operating system is configured to use the proxy device driver for its cdaudio device driver. In response to instructions from an application program to render CD Redbook audio, the proxy driver instead retrieves and renders a digitized audio file from a mass storage device such as a network server.

The digitized audio file on the network server is a WAVE file that is converted from the original Redbook format of the CD that is associated with the application program. To play the WAVE file, the proxy device driver calls the computer's standard WAVE file compound device driver, after converting Redbook-particular timing parameters to parameters that are appropriate for the compound device driver, taking into account the arrangement of the CD's performance tracks.

BRIEF DESCRIPTION OF THE DRAWINGS

FIGS. 4 and 5 are flow charts showing preferred steps in accordance with the invention.

DETAILED DESCRIPTION OF THE PREFERRED EMBODIMENT

The invention includes a system and method for directing a multimedia application program, executing on a client computing device, to render continuous media content that is read from a non-CD and non-track-oriented source such as a remote network server. The application program is of the type discussed above that normally renders media content directly from a removable CD associated with the application program. The application program is hard-coded to use a CD audio driver. A local CD drive, if it were present, would normally be used in conjunction with the CD audio driver to read and render the continuous media content from the CD.

The invention is described, as noted above, in the context of the Window® operating system and the MCI interfaces of the Window® operating system. Familiarity with these widely used components is therefore assumed. For more information regarding these components, refer to "Microsoft Win32 Software Development Kit for Microsoft Windows," published by Microsoft Developer's Network of Redmond, Wash. (last update January 1996), which is hereby incorporated by reference.

Figure 2:
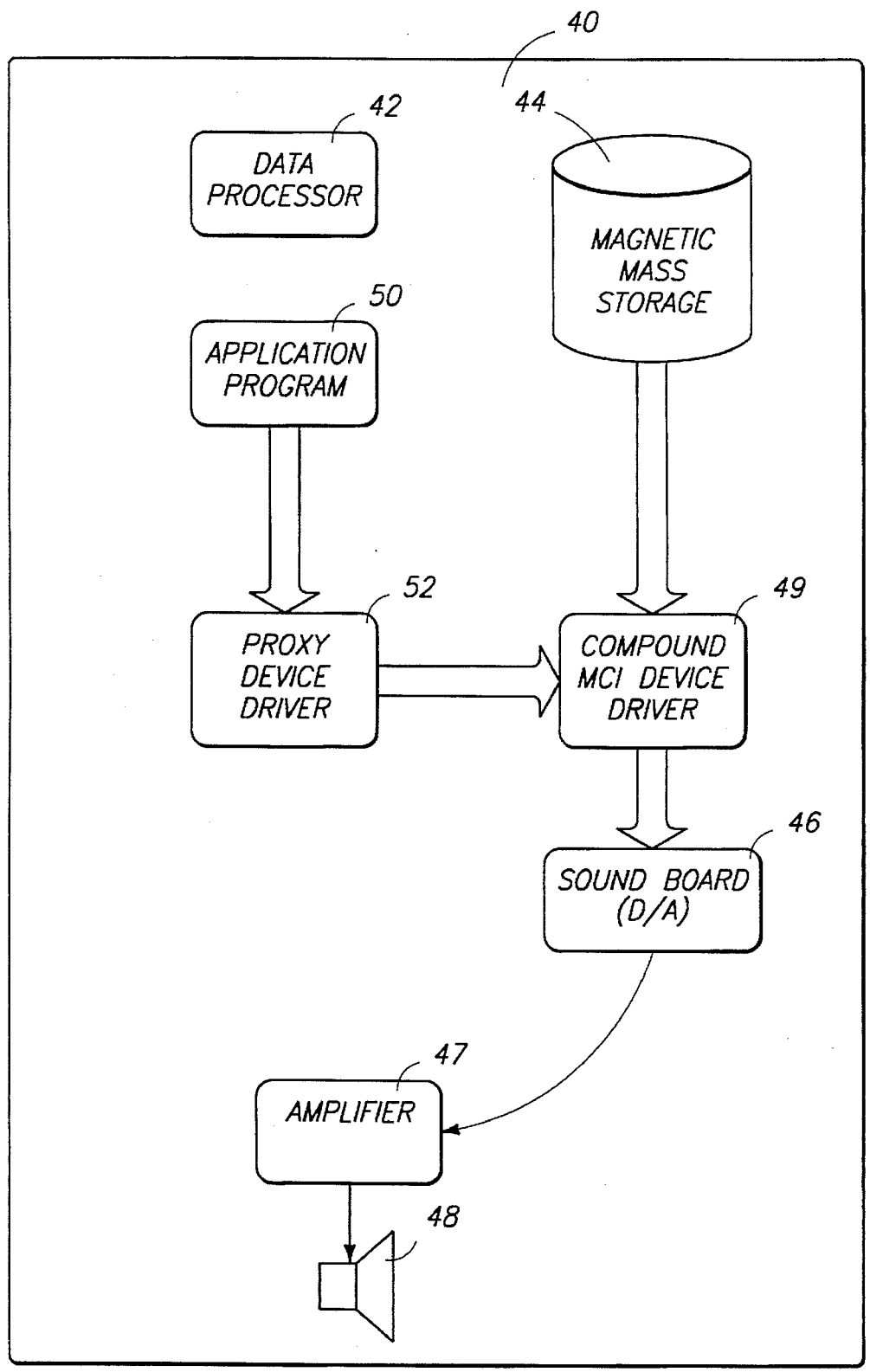
FIGS. 2 and 3 are block diagrams showing multimedia presentation systems in accordance with the invention.

FIG. 2 shows a computer or multimedia presentation system 40 for implementing the invention. Computer 40 has conventional components for running an application program such the multimedia application program described above. Such an application program normally renders continuous media content, such as digitized audio or video, from a default source medium using a simple device driver that is not part of the application program. More particularly, such an application program is associated with a pre-recorded removable CD having audio data in Redbook format, in which continuous media content is organized by one or more performance tracks.

Figure 1:
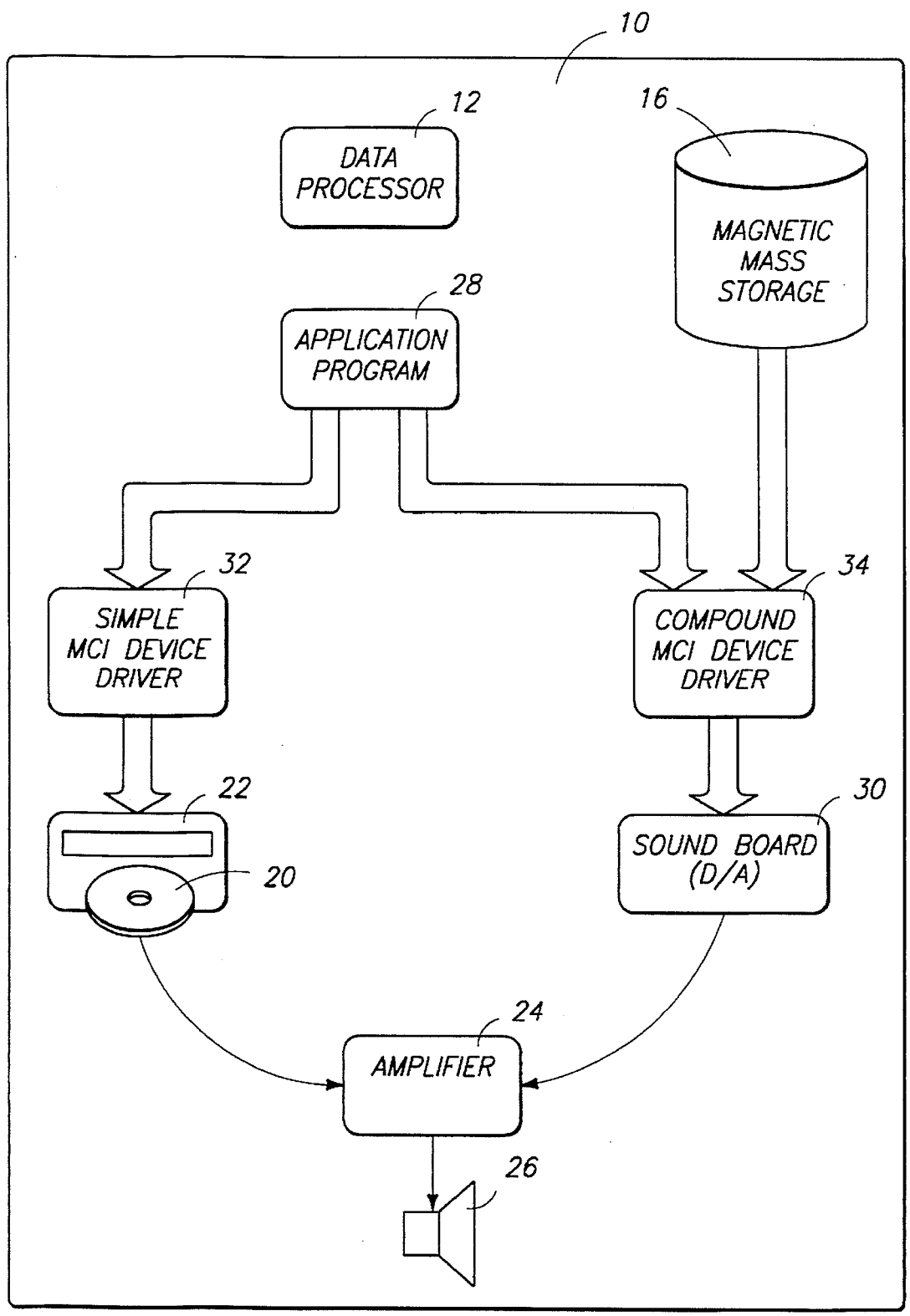
FIG. 1 is a block diagram showing a prior art multimedia presentation system.

The application program is configured to play the audio using a simple media drive that is local to the computer. A simple media drive is one having components for both reading and rendering continuous media content from a source medium. The CD driver of FIG. 1 is an example of a simple media drive. To play the CD associated with an application program, the application program normally identifies the CD only by the drive in which it is to be inserted. Specifically, the application program is configured to use an existing default interface exposed by the cdaudio driver, described above, to open and play the CD. The application program is not configurable by a user to alternatively get its continuous media content from any other mass storage device.

In the embodiment of FIG. 2, however, the computer does not necessarily have a CD drive. Rather, audio data must be read from a device other than that which the application program expects to contain the data, that is separate from the device which will actually render the audio data, and which does not organize data by performance tracks.

More specifically, computer 40 includes a data processor 42 and an associated mass storage device 44 other than the CD associated with the application program. Mass storage device 44 is a magnetic hard disk or another similar device. Mass storage device 44 could alternatively be an optical storage medium. While the mass storage device is illustrated as a local device, it might also be a network drive that is located remotely.

Computer 40 also includes a local rendering device 46 such as a conventional sound board. An amplifier 47 and speaker 48 are associated with the sound board.

Computer 40 runs under the Windows® operating system, which includes simple MCI device drivers and compound MCI device drivers for various types of simple and compound multimedia devices. These drivers include a compound device driver, designated in FIG. 2 by reference numeral 49, for streaming digitized audio to local rendering device 46. Specifically, compound device driver 49 executes on data processor 42 to read and continuous media content from mass storage device 44 and to render the media content on rendering device 46.

Computer 40 further includes an application program 50 such as the one discussed above, normally intended to run with a particular associated CD. Since the CD is not present, the Redbook data from the CD is stored on mass storage device 44. Before the data is stored on the mass storage device, it is converted to an alternative format. Specifically, it is converted to a WAVE file format or some other format that does not normally include CD track information. This can be done with publicly available computer programs, or by simply utilizing the known formats of Redbook audio and the different file formats. In the embodiment of FIG. 2, all audio tracks of the CD (typically tracks 2–n) are stored in a single WAVE file.

In addition to the actual digitized audio, track layout and timing information regarding the CD is stored On mass storage device 44. This information includes the cumulative length of the CD tracks, the number of tracks, the starting position of the first track on the CD, and the starting position of the first audio track on the CD. The position and length of each track is also recorded. These values, specified in milliseconds, are converted from the track/minute/second/frame format in which they are specified on the original Redbook-formatted CD.

A proxy device driver 52 is installed to execute on data processor 42 in place of the simple device driver normally used by application program 50. More specifically, proxy device driver 52 is installed in place of the normal driver associated with the cdaudio device on a Windows® computer. The installation is accomplished by modifying registry information maintained by the Windows® operating system. The registry information includes a statement as follows: cdaudio=driver. drv; where driver. drv is the name of the driver that is to be associated with a CD drive. In computers having an existing CD drive, driver. drv will be replaced with the name of the conventional simple device driver for the CD drive: mcicda. drv, for example. In the system of FIG. 2, driver. drv is replaced by the name of proxy device driver 52: proxy. drv for example.

Proxy device driver 52, in response to instructions from the application program to render the audio content from its associated CD, instead reads the WAVE file (previously converted from Redbook format) from mass storage device 44 and writes the audio data to sound board 46. In this manner, computer 40 can run application program 50 and force it to use a WAVE file from mass storage device 44 without requiring any modifications to the application program.

Proxy device driver 52 is configured to expose an interface, referred to herein as the proxy interface, that is substantially the same as that of the simple device driver normally used by the application program. Thus, the application program cannot detect that it is not interacting with the default CD audio driver. To actually render the WAVE file, proxy device driver 52 makes use of compound device driver 49. The primary function of proxy device driver 52 is therefore to translate between the interface it exposes to application program 50 and the exposed interface of compound device driver 49.

Compound device driver 49 is a default MCI WAVE file driver associated with the waveaudio device in Windows®. Proxy device driver 52 identifies the desired audio content to compound device driver 49 in terms of a filename relative to mass storage device 44 and instructs the compound device driver to render the audio content. It is also necessary for proxy device driver 52 to convert and supply timing information that is specified by application program 50. This timing information is specified by the application program in terms of Redbook-specific performance track information relative to the CD associated with the application program, since that is what would be expected by the original cdaudio driver. However, the WAVE file driver expects timing information to be specified in milliseconds or other parameters not specified in terms of tracks or track-related parameters. Proxy device driver 52 uses the stored and converted track layout and timing information of the original audio content to convert timing parameters specified by the application program to timing parameters that are acceptable by the compound device driver.

Figure 3:
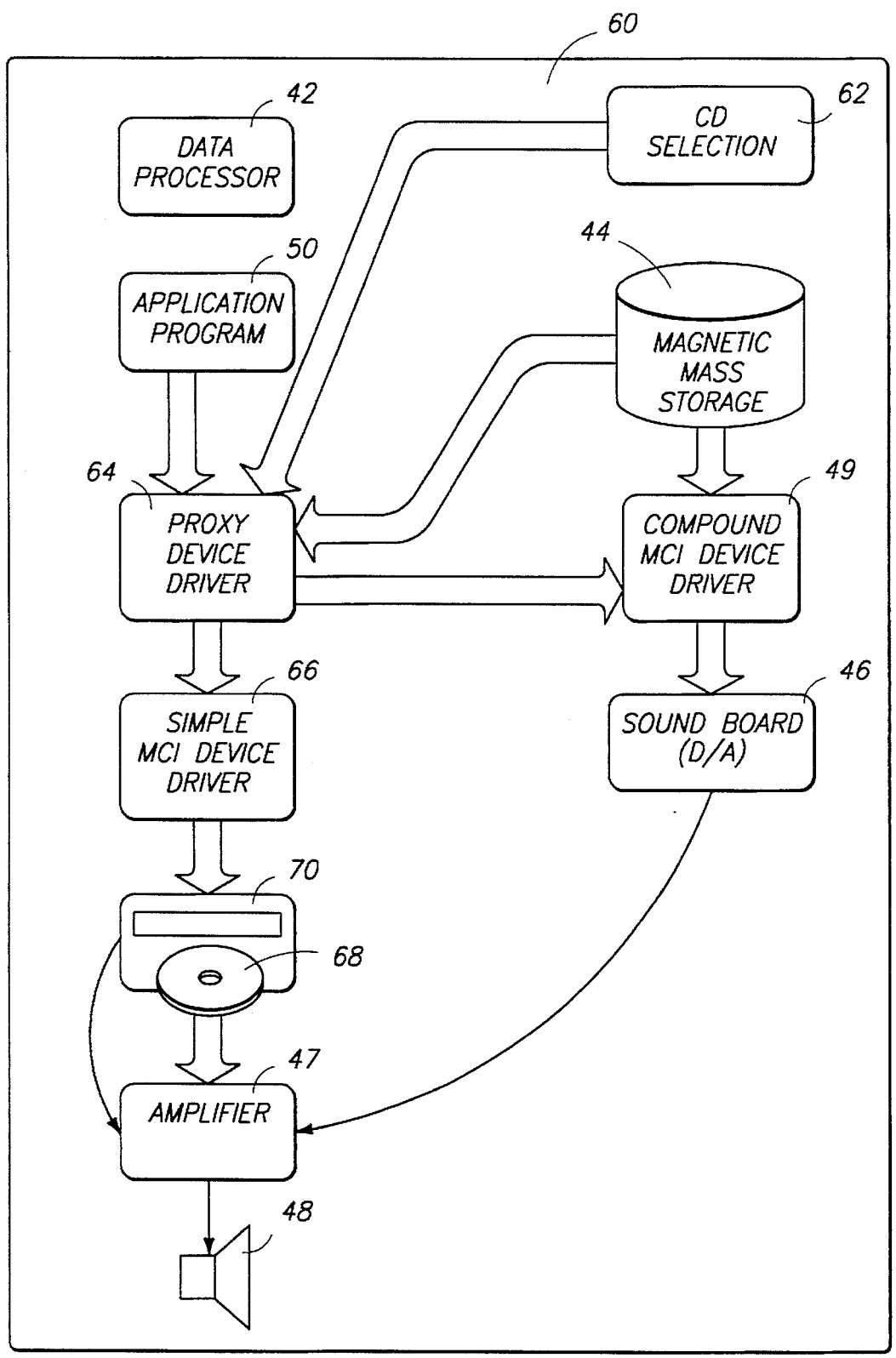

FIG. 3 shows a computer system 60 in accordance with another embodiment of the invention. Many components of system 60 are identical to those of FIG. 2, and are therefore labeled with identical reference numerals. In addition to the components of FIG. 2, system 60 has CD selection logic or means 62. CD selection means 62 is for identifying whatever application program is currently executing, and for selecting the appropriate WAVE file corresponding to the identified application program. Once the WAVE file is selected, the selection is recorded on mass storage device 44, for later access by proxy device driver 52.

One way to implement CD selection means 62 is as a configuration program that prompts a user to select from a number of available WAVE files corresponding to different application programs, or to simply indicate which application program will be executed next. The user's selection is stored on magnetic storage device 44, where it can be referenced by the proxy device driver. This implementation is somewhat inconvenient, as it requires the user to manually intervene before running an application program.

A second way to implement CD selection means 62 is as a program that automatically identifies the application program that will be making calls to the proxy device driver. For instance, such an application program might be a "launcher" program to initiate or launch any application program that might make calls to the proxy device driver. The user would be presented with a list of available programs, and would be allowed to select one of them. Upon such a selection being made, the launcher program would record the selection and identifying information for the appropriate WAVE file on mass storage device 44, and would then launch the selected application program. When called, the proxy device driver would refer to the recorded information indicating the appropriate WAVE file, and would render that WAVE file.

As a third option, it might be possible for CD selection means 62 to automatically detect when a program is launched by a user. This might be accomplished, for example, by registering a callback function with the Windows® operating system so that the CD selection means is notified upon the launch of any application program.

A fourth option is to monitor new program installations and modify operating system requests so that a launcher program is executed before the newly installed application program.

Finally, as a fifth option, CD selection means could be integrated in the proxy device driver itself, and the proxy device driver could figure out which application program was calling it.

The configuration of FIG. 3 has a further feature not present in that of FIG. 2. Computer system 60 has a proxy device driver 64 that is configurable to optionally play CDs through the normal cdaudio driver, indicated in FIG. 3 by reference numeral 66. This is accomplished by daisy-chaining the original cdaudio driver to the proxy device driver. In other words, cdaudio driver 66 is installed to executed on data processor 42 in response to proxy device driver 64. Proxy device driver 64 is configurable to use cdaudio driver 66 to render Redbook audio content from removable compact disk 68. When it is desired to play a CD using the cdaudio driver, commands are simply passed through proxy device driver 64 to the original cdaudio driver. This results in playback using an actual CD 68 and CD drive 70. CD selection means 62 is responsible for recording information indicating whether the proxy device driver should use the waveaudio driver or the cdaudio driver to render the CD audio associated with a particular application program.

FIGS. 4 and 5 show preferred steps implemented by the system described above for running an application program to render continuous media content from a mass storage device other than the CD with which the application program is normally associated. In FIG. 4, a step 102 comprises converting continuous media content off of a removable CD or other source medium, from a track-related format that is native to the CD to an alternative, non-track-related format suitable for rendering on a local rendering device such as a conventional sound board. Specifically, this step comprises converting Redbook audio from CD Redbook format to a WAVE file. This step also includes determining and storing track layout and timing information relating to the original layout of the CD and its Redbook audio content. A further step 104 in accordance with the invention comprises storing the continuous media content on a mass storage device in the alternative format—as a WAVE file. Preferably, the content from the CD is stored as a single WAVE file, although it might be desirable in some cases to create a separate WAVE file for each track of a CD.

In one embodiment of the invention, CD track and timing information are stored in a configuration file. The configuration file is stored separately from the actual media content, and contains a file specification for the converted WAVE file. The WAVE file might be located remotely, such as on a network drive.

A step 106 comprises installing a proxy device driver on a user's local computer that functions in place of the simple device driver normally used by the application program with which the CD is associated.

FIG. 5 shows steps performed by the proxy device driver. The steps of FIG. 5 are performed in response to instructions from an application program to render continuous media content using a local media drive associated with the simple device driver that would normally be expected to render the continuous media content. A step 120 comprises exposing a proxy interface to the application program from the proxy device driver. The exposed proxy interface is substantially the same as the existing exposed interface of the simple CD audio device driver.

A step 122 comprises identifying the application program through one of the methods described above. Step 124 comprises selecting the continuous media content depending on which application program is identified. These steps preferably result in configuration information being stored in a location that can be accessed by the proxy device driver. The configuration information might include a file specification for the selected media content, as well as track and timing information to allow the proxy device driver to convert from Redbook timing information to WAVE file timing specifications.

A further step 126 comprises reading the continuous media content from the mass storage device. This step is performed using standard operating system calls.

Step 128 comprises writing the continuous media content to the local rendering device, which in turn renders the media content. This step is performed by instructing a compound WAVE file device driver to render the media content, and includes a step of identifying the selected continuous media content to the WAVE file device driver in terms of a filename relative to the mass storage device. The filename is preferably extracted by the proxy device driver from the configuration information mentioned above. This step also includes converting timing parameters, specified by the application program in Redbook format, to timing parameters that are formatted in a way that is acceptable to the compound WAVE file device driver.

The proxy device driver is alternatively configurable to use the original simple CD audio device driver to render continuous media content from a removable source medium such as a CD, on a media driver such as a CD drive that is installed on the user's local computer.

The invention provides a way to use application programs, which formerly were restricted to use with a local CD drive, with audio or other media content that is stored on local or network mass storage devices. This allows CD-based application programs to be distributed and installed over networks, without any modifications to the application programs themselves.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. In a multimedia presentation system for running an application program, wherein the application program normally renders continuous media content from a default source medium using a simple device driver that is not part of the application program, and wherein the application program identifies the default source medium in terms of a local media drive that both reads and renders the continuous media content, a method of running the application program to render the continuous media content from a mass storage device rather than from the default source medium, the method comprising:

installing a proxy device driver that functions in place of the simple device driver normally used by the application program;

the proxy device driver, in response to instructions from the application program to render the continuous media content, reading the continuous media content from the mass storage device and rendering the continuous media content from the mass storage device without any modifications to the application program.

2. In a multimedia presentation system as recited in claim 1, wherein the rendering step comprises writing the continuous media content to a local rendering device after reading the continuous media content from the mass storage device.

3. In a multimedia presentation system as recited in claim 1, wherein the mass storage device is remotely located.

4. In a multimedia presentation system as recited in claim 1, wherein the mass storage device is a network drive.

5. In a multimedia presentation system as recited in claim 1, wherein the proxy device driver performs the following steps:

using a compound device driver to read and render the continuous media content;

identifying the continuous media content to the compound device driver in terms of a filename relative to the mass storage device.

6. In a multimedia presentation system as recited in claim 1, wherein the simple device driver has an existing exposed interface, the method further comprising a step of exposing a proxy interface to the application program from the proxy device driver, wherein the proxy interface is substantially the same as the existing exposed interface of the simple device driver.

7. In a multimedia presentation system as recited in claim 1, further comprising the following additional steps:

converting the continuous media content to an alternative data format;

storing the continuous media content on the mass storage device in the alternative data format prior to reading the continuous media content from the mass storage device.

8. In a multimedia presentation system as recited in claim 1, wherein the proxy device driver is configurable to perform a step of using the simple device driver to render the continuous media content from the default source medium with the local media drive.

9. In a multimedia presentation system for running an application program, wherein the application program normally renders continuous media content from a removable source medium using a default device driver that is not part of the application program, wherein the continuous media content is organized as one or more performance tracks on the removable source medium, a method of running the application program to render the continuous media content from a mass storage device rather than from the removable source medium, the method comprising:

converting the continuous media content from a performance track format that is native to the removable source medium to an alternative format suitable for rendering on a local rendering device;

storing the continuous media content on the mass storage device in the alternative format;

installing a proxy device driver that functions in place of the default device driver normally used by the application program;

the proxy device driver, in response to instructions from the application program to render the continuous media content from the removable source medium, instead performing the following steps:

reading the continuous media content from the mass storage device;

writing the continuous media content to the local rendering device.

10. In a multimedia presentation system as recited in claim 9, wherein the mass storage device is remotely located.

11. In a multimedia presentation system as recited in claim 9, wherein the mass storage device is a network drive.

12. In a multimedia presentation system as recited in claim 9, wherein the proxy device driver reads and writes the continuous media content using a compound device driver, wherein the proxy device driver identifies the continuous media content to the compound device driver in terms of a filename relative to the mass storage device.

13. In a multimedia presentation system as recited in claim 9, wherein the default device driver has an existing exposed interface, the method further comprising a step of exposing a proxy interface to the application program from the proxy device driver, wherein the proxy interface is substantially the same as the existing exposed interface of the default device driver.

14. In a multimedia presentation system as recited in claim 9, wherein the proxy device driver is configurable to perform a step of using the default device driver to render the continuous media content from the removable source medium.

15. In a multimedia presentation system as recited in claim 9, further comprising steps of identifying the application program and selecting the continuous media content depending on which application program is identified.

16. In a computer for running an application program, wherein the application program normally renders continuous media content from a removable compact disk that is associated with the application program, the application program normally using a simple device driver that is not part of the application program to render the continuous media content, wherein the application program identifies the continuous media content to the simple device driver in terms of performance track information relative to the removable compact disk, the simple device driver being associated with a compact disk drive that both reads and renders the identified continuous media content from the removable compact disk; a method of running the application program to render the continuous media content from a mass storage device rather than from the removable compact disk, the method comprising:

installing a proxy device driver in the computer that functions in place of the simple device driver normally used by the application program;

exposing a proxy interface to the application program from the proxy device driver, wherein the proxy interface is substantially the same as an existing interface exposed by the simple device driver;

the proxy device driver, in response to instructions from the application program to render the continuous media content, identifying the continuous media content to a compound device driver in terms information other than performance track information, and instructing the compound device driver to render the continuous media content.

17. In a computer as recited in claim 16, wherein the mass storage device is remotely located.

18. In a computer as recited in claim 16, wherein the mass storage device is a network drive.

19. In a computer as recited in claim 16, further comprising the following additional steps:

converting the continuous media content to an alternative data format that is not organized as performance tracks;

storing the continuous media content on the mass storage device in the alternative data format.

20. In a computer as recited in claim 16, further comprising the following additional steps:
converting the continuous media content to an alternative data format that is not organized as performance tracks;
determining performance track information of the continuous media content relative to the compact disk;
storing the continuous media content on the mass storage device in the alternative data format;
storing the performance track information.

21. In a computer as recited in claim 16, further comprising the following additional steps:
converting the continuous media content to an alternative data format that is not organized as performance tracks;
determining performance track information of the continuous media content relative to the compact disk;
storing the continuous media content on the mass storage device in the alternative data format;
storing the performance track information;
the proxy device driver using the stored performance track information to convert track-related timing parameters specified by the application program relative to the compact disk to timing parameters that are acceptable by the compound device driver.

22. In a computer as recited in claim 16, wherein the proxy device driver is configurable to perform a step of using the simple device driver to render the continuous media content from the compact disk with a local compact disk drive.

23. A method of directing an application program executing on a client computing device to render continuous media content from a remote network server, wherein the application program is of a type that normally renders continuous media content from a removable compact disk associated with the application program, the application program normally using a compact disk device driver that is not part of the application program to render the continuous media content from a local compact disk drive, wherein the local compact disk drive, if it were present, would both read and render the continuous media content from the removable compact disk; the method comprising:
converting the continuous media content from a format that is native to the compact disk to an alternative format suitable for rendering without the compact disk drive;
storing the continuous media content on the remote network server in the alternative format;
installing a proxy device driver that executes on the client computing device in place of the simple device driver normally used by the application program;
the proxy device driver, in response to instructions from the application program to render the continuous media content using the local compact disk drive, instead performing the following steps:
reading the continuous media content from the remote network server;
locally rendering the continuous media content.

24. A method as recited in claim 23, wherein the rendering step is performed by writing the continuous media content to a local rendering device.

25. A method as recited in claim 23, further comprising the following additional steps:
determining performance track information of the continuous media content relative to the compact disk;
storing performance track information.

26. A method as recited in claim 23, wherein the proxy device driver is configurable to perform a step of using the simple device driver to render the continuous media content from the compact disk with a local compact disk drive.

27. A multimedia presentation system for running an application program, wherein the application program normally renders continuous media content from a default source medium using a simple device driver that is not part of the application program, and wherein the application program identifies the default source medium in terms of a local media drive that both reads and renders the continuous media content from the default source medium, the multimedia presentation system comprising:
a data processor;
a mass storage device other than the default source medium, the mass storage device storing the continuous media content;
a local rendering device;
a proxy device driver installed to execute on the data processor in place of the simple device driver normally used by the application program;
wherein the proxy device driver, in response to instructions from the application program to render the continuous media content, reads the continuous media content from the mass storage device and writes the continuous media content to the local rendering device without any modifications to the application program.

28. A multimedia presentation system as recited in claim 27, wherein the mass storage device is remotely located.

29. A multimedia presentation system as recited in claim 27, wherein the mass storage device is a network drive.

30. A multimedia presentation system as recited in claim 27, further comprising:
a compound device driver that executes on the data processor to read and render the continuous media content;
wherein the proxy device driver identifies the continuous media content to the compound device driver in terms of a filename relative to the mass storage device.

31. A multimedia presentation system as recited in claim 27, wherein the simple device driver has an existing exposed interface, wherein the proxy exposes a proxy interface to the application program, wherein the proxy interface is substantially the same as the existing exposed interface of the simple device driver.

32. A multimedia presentation system as recited in claim 27, wherein the continuous media content is stored on the mass storage device in an alternative format.

33. A multimedia presentation system as recited in claim 27, further comprising the simple device driver and the local media drive, the simple device driver being installed to execute on the data processor in response to the proxy device driver, wherein the proxy device driver is configurable to use the simple device driver to render the continuous media content from the default source medium with the local media drive.

34. A multimedia presentation system as recited in claim 27, further comprising means for identifying the application program and for selecting the continuous media content depending on which application program is specified.

35. A multimedia presentation system for running an application program, wherein the application program normally renders continuous media content from a removable compact disk that is associated with the application program, the application program normally using a default device driver that is not part of the application program to render the continuous media content, wherein the application program identifies the continuous media content to the simple device driver in terms of performance track information relative to the removable compact disk, the default device driver being associated with a compact disk drive that both reads and renders the identified continuous media content from the removable compact disk; the multimedia presentation system comprising:

- a data processor;
- a mass storage device other than the removable compact disk, the mass storage device storing the continuous media content in a format that is not organized as performance tracks;
- a local rendering device;
- a proxy device driver installed to execute on the data processor in place of the default device driver normally used by the application program;
- a compound device driver that executes on the data processor to read and render the continuous media content;
- wherein the proxy device driver, in response to instructions from the application program to render the continuous media content, identifies the continuous media content to the compound device driver in terms of a filename relative to the mass storage device, and instructs the compound device driver to render the continuous media content.

36. A multimedia presentation system as recited in claim 35, wherein the mass storage device is remotely located.

37. A multimedia presentation system as recited in claim 35, wherein the mass storage device is a network drive.

38. A multimedia presentation system as recited in claim 35, wherein the default device driver has an existing exposed interface, wherein the proxy exposes a proxy interface to the application program, wherein the proxy interface is substantially the same as the existing exposed interface of the default device driver.

39. A multimedia presentation system as recited in claim 35, wherein the proxy device driver uses performance track information of the continuous media content relative to the compact disk to convert timing parameters specified by the application program to timing parameters that are acceptable by the compound device driver.

40. A multimedia presentation system as recited in claim 35, further comprising the default device driver and the compact disk drive, the default device driver being installed to execute on the data processor in response to the proxy device driver, wherein the proxy device driver is configurable to use the default device driver to render the continuous media content from the default source medium with the compact disk drive.

41. A multimedia presentation system as recited in claim 35, further comprising means for identifying the application program and for selecting the continuous media content depending on which application program is specified.

* * * * *